E. B. Dewey,
Grapple.
Nº 84,683. Patented Dec. 8, 1868.
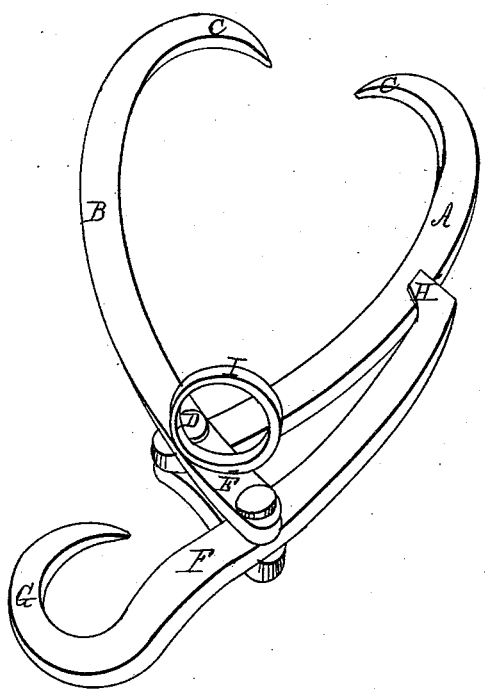
Witnesses:
George Buhlwidt
Geo Cay.
Inventor:
E B Dewey
Per Attorney
Thos S Sprague

EDWIN B. DEWEY, OF PONTIAC, MICHIGAN.

Letters Patent No. 84,683, dated December 8, 1868.

IMPROVEMENT IN LEVER-GRAPNEL.

The Schedule referred to in these Letters Patent and making part of the same.

*To whom it may concern:*

Be it known that I, EDWIN B. DEWEY, of Pontiac, in the county of Oakland, in the State of Michigan, have invented a new and useful Improvement in Lever-Grapnels; and I do hereby declare that the following is a true and accurate description thereof, reference being had to the accompanying drawings, and to the letters of reference marked thereon, and making a part of this specification.

The drawing very fully shows the nature of the invention, which consists of two curved levers, A and B, their outer extremities being pointed at C, as will be seen.

These levers are pivoted together at D, the lever A being shorter than the lever B, and pivoted to it as shown.

To the shorter arm E, of the lever B, and near its extremity, is pivoted a bearing-lever, F, provided at its lower extremity with a suitable hook, G, and at its other end with ears H, which rest upon each side of the lever A, and act as guides to control the position of the lever F.

I is a ring or socket, into which to insert a pole, of any desired length, with which to raise the apparatus to the rafter of a barn, for instance.

When used as a grapnel, to which to attach a tackle, for hoisting weights, hitch the tackle to the hook G; then, with a pole inserted in the socket or ring I, raise the apparatus to any convenient beam or rafter, when the points of the curved levers will enter the timber of the beam or rafter. The weight being applied directly to the lower end of the bearing-lever F, the heavier such weight is, the harder it will make the grapnel hold to the timber.

What I claim as my invention, is—

The bearing-lever F, provided with suitable hook G, when connected with curved and pointed levers A and B, and constructed and operating substantially as and for the purposes herein set forth and described.

EDWIN B. DEWEY.

Witnesses:
   H. S. SPRAGUE,
   H. F. EBERTS.